United States Patent [19]
Aldereguia et al.

[11] Patent Number: 5,481,552
[45] Date of Patent: Jan. 2, 1996

[54] METHOD AND STRUCTURE FOR PROVIDING ERROR CORRECTION CODE FOR 8-BYTE DATA WORDS ON SIMM CARDS

[75] Inventors: Alfredo Aldereguia, Boca Raton; Daryl C. Cromer, Boynton Beach; Kim K. Sendlein, Boca Raton, all of Fla.

[73] Assignee: International Business Machines Corporation, Armonk, N.Y.

[21] Appl. No.: 177,078

[22] Filed: Dec. 30, 1993

[51] Int. Cl.⁶ .................................................. H03M 13/00
[52] U.S. Cl. ........................................ 371/40.1; 371/37.1
[58] Field of Search ................................ 371/37.1, 37.2, 371/37.4, 37.6, 37.7, 40.1, 43, 37.3, 40.2; 395/425

[56] References Cited

U.S. PATENT DOCUMENTS

| | | | |
|---|---|---|---|
| 5,235,693 | 8/1993 | Chinnaswamy et al. | 395/425 |
| 5,283,877 | 2/1994 | Gastinel et al. | 395/425 |
| 5,313,475 | 5/1994 | Cromer et al. | 371/40.1 |
| 5,331,645 | 7/1994 | Miller et al. | 371/37.1 |
| 5,335,234 | 8/1994 | Matteson et al. | 371/40.1 |
| 5,430,742 | 7/1995 | Jeddeloh et al. | 371/40.1 |

*Primary Examiner*—Roy N. Envall, Jr.
*Assistant Examiner*—Brian C. Oakes
*Attorney, Agent, or Firm*—Calfee, Halter & Griswold

[57] ABSTRACT

The present invention relates to a method and structure for implementing a 64/8 ECC algorithm on a SIMM using a computer which has a 32-bit bus and is configured with a 36-bit wide memory. This is accomplished by writing two successive 4 byte words from the system to latches, to form an 8 byte quad word, and writing 8 check bits utilizing the entire 64 bits of the quad word. One-half of the quad word (i.e., 32 bits) together with 4 of the 8 check bits for a total of 36 bits is stored at one address location in memory, and the remaining 32 bits of the quad word, together with the remaining 4 check bits, are stored at another, preferably the successive 36 bit, address location in memory. When the quad word and check bits are read from the memory, they are read serially, i.e., the first 32 bits and 4 associated check bits are read and latched, followed by the second 32 bits and the 4 associated check bits being read and combined with the first 32 bits of data and 4 check bits so as to essentially "reconstitute" the original 64-bit quad word with 8 check bits. From the "reconstituted" 64-bit data word and 8 check bits, the error correction is performed. The 64-bit quad word with the corrected data is latched and asserted successively on the data bus as two 32-bit words. Also, preferably logic and circuitry to perform a read-modify-write (R-M-W) function are provided.

17 Claims, 5 Drawing Sheets

METHOD AND STRUCTURE FOR PROVIDING ERROR CORRECTION CODE FOR 8-BYTE DATA WORDS ON SIMM CARDS

FIELD OF THE INVENTION

This invention relates generally to error correction code on single inline memory modules (SIMMs) which can be used in computer systems, which systems do not have error correction code. More particularly, this invention relates to utilizing 8-byte (64 bit) data words with error correction code for the entire 8 byte data word on computer systems having 32 bit (4 byte) data busses and on SIMMs which are configured with 36-bit wide memory bus at each address space.

BACKGROUND OF THE INVENTION

The integrity requirements for personal computer systems has grown rapidly in the past few years. At the present time, newer operating systems and applications require a great deal of memory, and the amount of memory which can be accommodated in personal computer systems continues to increase rapidly. Such personal computer systems have in the past typically been provided only with the capability of writing and checking parity. In such a case, if a single bit of memory is corrupted, the non-parity condition will be flagged, and generally the system will halt when the error is detected. This poses a significant problem since users can ill afford to have periodic system crashes and/or loss of data, and as the amount of memory increases, the possibility of such data corruption increases significantly. Moreover, with the advent of large applications which normally require large amounts of memory, these are the most exposed to such crash and data corruption.

As indicated above, until very recently most conventional current low end personal computer systems contained only parity SIMMs which can detect single bit errors, but cannot correct such errors. Moreover, a parity function may not detect double or other multiple-bit errors.

One solution which has been proposed to eliminate system crash or loss of data due to single-bit errors is to provide error correction code for use in computer systems which do not have error correction code capabilities internal thereto. Typically, this error correction code allows for the detection of most double-bit errors and the correction of all single-bit errors. These schemes are a significant improvement over purely parity SIMMs. One technique for utilizing ECC is the so-called 32/7-bit ECC algorithm. This ECC algorithm requires 7 check bits for each double word (i.e., 4 bytes or 32 bits). This results in a 39-bit wide memory SIMM required for each double word and associated 7-check bits (32 data bits+ 7 check bits). Thus, the widely-used 36-bit wide memory SIMM is not available to be used, although this is a conventional and popular size SIMM and is used with double words containing only parity bits which requires only 36 bits (32 data bits plus 4 parity bits). Thus, the ECC requires an increase of 8% to 9% in storage capacity above that required for a similar number of data words, using only parity rather than ECC. However, this 32/7 bit ECC algorithm does allow for double bit detection and single bit correction. Typically a 40-bit wide SIMM is used for 32/7 error correction code resulting in one unused bit (i.e., 40 minus 32 minus 7 equals 1). Examples of how this is implemented on certain types of SIMMs are shown in U.S. patent applications Ser. No. 08/154,193, filed Nov. 17, 1993, and entitled "Initialization Methodology for Computer System Having Error Correction Code on Add-On Cards for Writing Portions of Data Words" (Atty. Docket No. BC9-92-053); Ser. No. 08/154,192, filed Nov. 17, 1993, and entitled "Error Correction Code with Write Error Preservation for Add-On Memory" (Atty. Docket No. BC9-92-067); and U.S. Pat. No. 5,452,429 entitled "Error Correction Code on Add-On Cards for Writing Portions of Data Words". Another complication which arises from using a 32/7-bit ECC algorithm is encountered due to the fact that SIMMs are created from memory modules which typically are 4, 8, 9, 16 or 18-bits wide. Thus, the amount of memory required must be selected as multiples of these module sizes. This may require extra memory space to store differently configured memory, as will be described presently.

Another potential technique for providing ECC is by use of the 64/8-bit ECC algorithm. In this algorithm, 8 check bits are generated for each quad word (i.e., 8 bytes or 64 bits) of data in memory. This technique takes advantage of the fact that the 64/8-bit ECC algorithm is as efficient as the 32/4-bit parity technique in the amount of memory needed for storage; i.e., if two parity SIMM addresses are used, the result is 2×32/4 or 64/8. Thus, the heed for additional modules to store the same amount of data is eliminated. However, if implemented conventionally, this technique has the disadvantage that it requires a 72-bit data path to memory (i.e., 64 data bits+ 8 parity bits= 72 bits) including either a 32-bit or a 64-bit system bus. For a high performance system with large memory capacity and advanced CPUs, this implementation works well. However, for low-cost solutions, this is not an alternative since most personal computers are configured with a 32-bit memory bus, and thus the implementation would require a second 32-bits of memory bus and more control chips which would add significantly to the cost of this system.

Thus, it is an object of the present invention to provide an improved ECC on SIMM which uses no more capacity than conventional parity SIMMs and which can be implemented on a 32-bit memory bus.

SUMMARY OF THE INVENTION

According to the present invention, a method and structure for implementing a 64/8 ECC algorithm on a SIMM using a computer which has a 32-bit bus and in a memory that is configured with a 36-bit wide memory is provided. This is accomplished by writing two successive 4 byte words from the system to latches, to form an 8 byte quad word, and writing 8 check bits utilizing the entire 64 bits of the quad word. One-half of the quad word (i.e., 32 bits) together with 4 of the check bits for a total of 36 bits are stored at each 8 address location in memory, and the remaining 32 bits of the quad word, together with the remaining 4 check bits, are stored at another, preferably the successive 36 bit, address location in memory. When the quad word and check bits are read from the memory, they are read serially, i.e., the first 32 bits and 4 associated check bits are read and latched, followed by the second 32 bits and the 4 associated check bits being read and combined with the first 32 bits of data and 4 check bits so as to essentially "reconstitute" the original 64-bit quad word with 8 check bits. From the "reconstituted" 64-bit data word and 8 check bits, the error correction is performed. The 64-bit quad word with the corrected data is latched and asserted successively on the data bus as two 32-bit words. Also, preferably logic and circuitry to perform a read-modify-write (R-M-W) function are provided.

DESCRIPTION OF THE PREFERRED EMBODIMENT

Figure 1A:
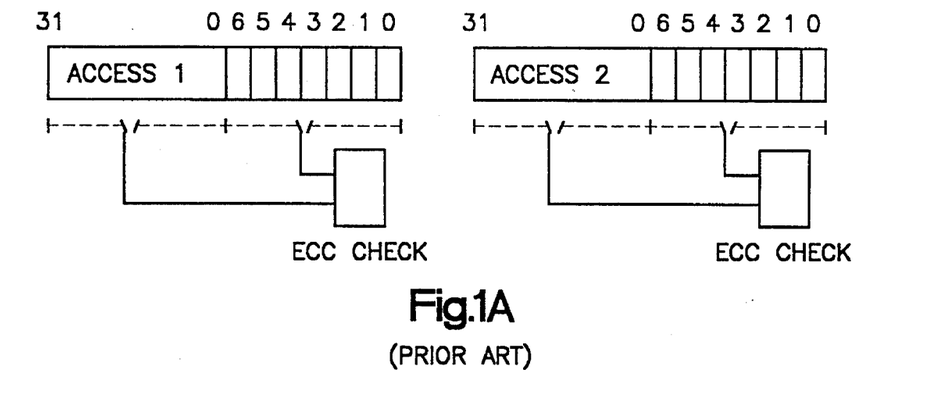
FIGS. 1A and 1B show in diagrammatic form, very schematically, two prior art techniques of ECC on SIMMs.

As indicated previously, there have been several prior art techniques advanced for utilizing error correction code in computer systems, and particularly using ECC on add-on SIMMs (single inline memory modules) for use in personal computers. Two of these techniques are shown very diagrammatically in FIGS. 1A and 1B. FIG. 1A depicts a technique wherein a quad word (e.g., a word of 64-bits in length, i.e., 8 bytes) is written as 2 separate double words, each 32 bits wide from the write cycle. Each 32-bit portion of the word is utilized to calculate 7 check bits, and these 32-bits of data with the 7 check bits are independently generated, stored, read and used to create syndrome bits for error correction. Thus, to get a 64-bit word, two completely separate operations are required, each operation being treated essentially as writing a single word and generating check bits therefrom. Only after the operation has been completed of writing, storing and reading back the data bits and associated check bits with each 32-bits of data, are the two 32-bits of data put together to form a 64-bit quad word. This has several disadvantages. First, since there are 32 data bits and 7 check bits required for each half of the data word, this requires storage of a total of 78 bits. Moreover, separate operations have to be performed for generating check bits and generating syndrome bits for each half of the word, thus requiring two separate operations for running the error correction code.

Figure 1B:
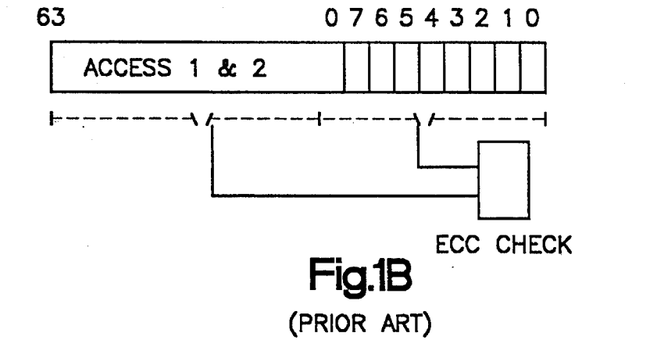

FIG. 1B shows another prior art technique wherein a quad word, e.g. a word of 64 bits in length, is used to generate 8 check bits. This is done in a single write operation and is read in a single read operation, and the check bits are used to provide a single set of 8 syndrome bits. This technique has the advantage of requiring only 72 bits of storage per data word and associated check bits as opposed to the requirement of 78 bits of storage for the data and check bits as shown in the technique of FIG. 1A. It also has the advantage of only doing a single operation on generating check bits and syndrome bits for each entire data word. It does, however, present the problem of requiring 72-bit wide buses and data storage. Most personal computers have buses which at the most are 32-bits wide. Hence, this would require increasing the bus an additional 32 bits, with the associated buffers and additional logic as indicated previously. This is costly and requires redesign of the computer system to accommodate 72-bit width of storage and bus.

Figure 1C:
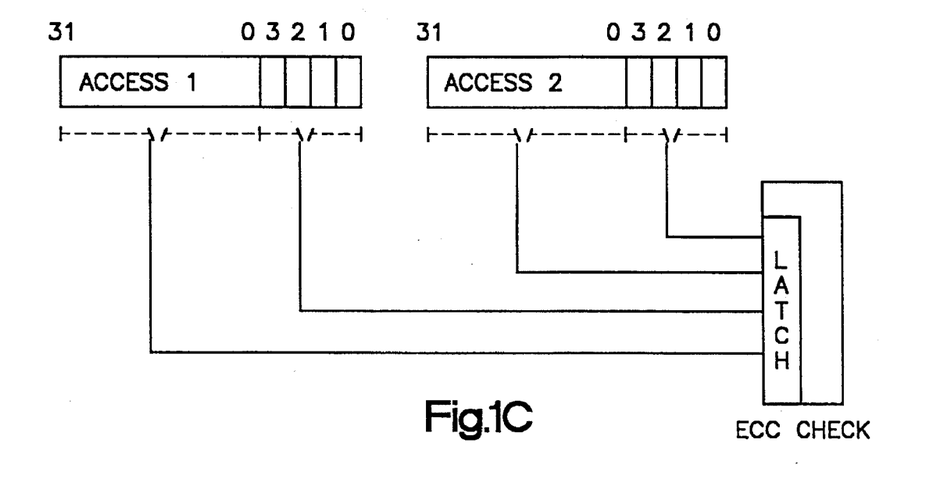
FIG. 1C shows in diagrammatic form, very schematically, error correction code on ECCs according to the present invention.

FIG. 1C depicts diagrammatically the ECC technique as used on a SIMM according to the present invention. According to the present invention, the quad data word of 64 bits is written by first writing two 32 bit data word successively on a 32-bit bus, and combining these two 32 bit word to form a 64 bit Quad word. From the 64 bit quad word, 8 check bits are generated using all 64 bits of the quad data word. These are stored in two separate addresses of memory, one address storing the first 32 bits of the data word together with 4 of the check bits, and a second address storing the second 32 bits of the data word together with the other 4 of the check bits. To access the word, two separate accesses are required; on the first access, the first 32 bits of data and 4 associated check bits are accessed and latched in a buffer. Following this, the second 32 bits, together with their 4 associated check bits are accessed and also latched in the buffer. The entire 64 bits of data and 8 check bits are used for error correction, the error correction taking place just as it would with the correction code of FIG. 1B, but this has been accomplished by using a 36-bit wide channel as opposed to a 64-bit wide channel. Moreover, it will be noticed that the two sections of the quad word each contain 32-bits of data and 4 check bits. This is the exact configuration used to store data bits with parity bits rather than ECC. Thus, with the same amount of storage space required for parity, and still utilizing a 36-bit wide address, a quad data word of 64 bits with error correction code onboard the SIMM can be provided without increasing the amount of storage necessary for conventional parity SIMM configuration. This can be shown from an examination of Table I below.

TABLE I

| Module Width | Parity (36-bits) | ECC (40-bits) |
| --- | --- | --- |
| x4 | 9 - x4 modules | 10 - x4 modules |
| x8 | 4 - x8 modules | 5 - x8 modules |
|  | 1 - x4 modules |  |
| x9 | 4 - x9 modules | 4 - x9 modules |
| x16 | 2 - x16 modules | 2 - x16 modules |
|  | 1 - x4 modules | 2 - x4 modules |
| x18 | 2 - x18 modules | 2 - x4 modules |

As can be seen in Table I, a comparison is made of various module widths and how many modules are required for a comparable amount of data storage for ECC on 32-bit words as compared to parity bits of 32-bit words. In each instance, one or two additional modules or larger modules are required to store the information. However, with the present invention, the same amount of storage is used for error correction on 64 data bits as is used for parity on two 32-bit data words, i.e., in each case 8 additional bits are required, which in the case of 64-bit error correction are 8 check bits, and which in the case of two 32-bit words for parity, 4 parity bits are used for each double word.

Figure 2:
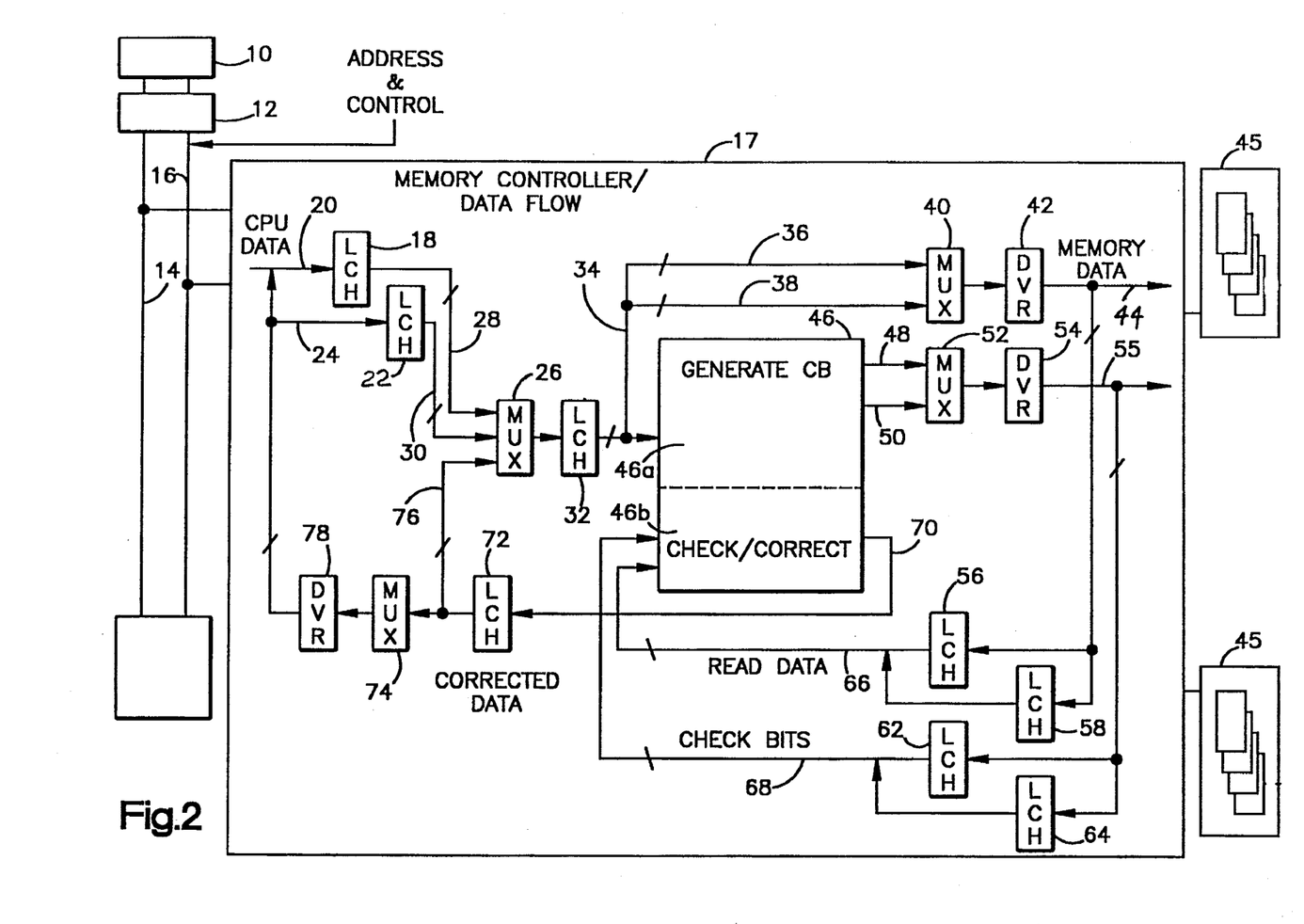
FIG. 2 is a high level diagram of the circuitry to perform the error correction code on 64 bits of data as quad words from a 32-bit CPU data bus according to the present invention.

Turning now to FIG. 2, the circuitry for performing error correction code on board or in conjunction with a SIMM is shown in which two 32-bit words are received from a 32 bit system bus in a computer. The two 32-bit double words are combined to form a quad or 64-bit word which is then used to generate 8 error correction code check bits. The 64 data bits and 8 check bits are stored in memory at two separate addresses, with the 32-bits of data and 4 check bits stored at each location. On a read cycle, the two addresses in memory are read successively, and the two double words of 32 bits each are recombined to form a "reconstituted" original 64-bit quad word. The reconstituted 64 bit Quad word is then run through the error correction tree together with the eight check bits, any errors corrected, and the corrected reconstituted 64-bit word is outputted and latched and then asserted on the CPU data bus as two successive 32-bit double words.

As shown in FIG. 2, a central processing unit (CPU) 10 is provided which has a microprocessor which could be 80386 or 80486 or Pentium chips of the type manufactured by Intel Corporation or the 601 or 603 chips manufactured by Motorola Corp. could be used. Preferably, the CPU is designed to support write in Burst mode. To efficiently operate in this mode a write-back cache 12 is provided which writes onto a 32-bit data bus 14. Also the write-back cache writes onto an address and control bus 16, which together with the data bus 14 constitutes the CPU or system bus. The data bus 14 and control bus 16 are connected to a memory controller chip 17 having circuitry which controls the read-write cycles between the CPU 10 and memory. To perform the ECC and data control function of the present invention, the memory controller includes a write latch 18 which is connected to the data bus 14 by a data line 20, and a write latch 22 which is connected by a data line 24 to the data bus 14. The latches 18, 22 write 64 bits of data to a 128 bit wide read-modify-write multiplexor 26 through lines 28, 30, each of which is a 32-bit line to match the 32-bit input from the data bus 14 and out of each of the latches 18, 22. From the read-modify-write multiplexor 26, the data goes through ECC latch 32 onto a 64-bit data line 34, which is provided with two 32-bit paths 36, 38 to a high/low multiplexor 40 which in turn is connected to a driver 42, which driver 42 asserts memory bits onto line 44 for storage in memory 45. The 64-bit line 34 also connects to the error correction code generator/corrector 46, which in a conventional manner generates error correction code check bits and also decodes check bits. Thus, the error correction code generator/corrector has a generating section 46a and a correcting section 46b. The generating section 46a generates 8 check bits based on the 64-bit quad word which was delivered from the multiplexor 26 through latch 32 and puts four of the check bits on line 48, i.e., check bits 0–3, and four of the check bits on line 50, i.e., check bits 4–7. Lines 48 and 50 deliver the check bits to check bit multiplexor 52, which is connected to a driver 54 which puts the check bits on check bit line 55 which are delivered to memory 45, with the check bits 0–3 being stored with memory data bits 0–31 and check bits 4–7 being stored with memory data bits 32–63, as will be described presently. At this point it should be noted that all of the 64 bits are used to generate the 8 check bits; thus the four check bits stored with each 32 bit double word do not relate only the that double word.

Very briefly, the section of the memory controller 17 described so far reads a first double word consisting of bits 0–31, latches it in latch 18 and then reads a second double word of 32 bits, i.e. bits 32–63 and latches it in latch 22. These two double words are impressed on multiplexor 26 as a 64-bit quad word, which in turn delivers the quad word through ECC latch 32 to a 64-bit line 34 and also to the error correction code generator/corrector 46. The 64-bit line 34 provides two 32-bit paths of data, the data path for data bits 0–31 being line 36 and the data path for data bits 32–63 being line 38 which are impressed on multiplexor 40. The error correction code generator/corrector 46 generates 8 check bits, 0–7, based on the entire 64-byte quad word. The check bits 0–3 are impressed on line 48 and check bits 4–7 are impressed on line 50 to multiplexor 52. Multiplexors 40 and 52 are actuated and driven by drivers 42, 54 to store data bits 0–31 together with check bits 0–3 at a first memory address which is 36 bits wide, and to store memory bits 32–63 at the second double word together with check bits 4–7 on the next adjacent memory location which is also 36 bits wide. The operation of the write portion of the logic circuitry will be described in more detail presently in conjunction with the timing diagrams.

To read the data, essentially the reverse of the operation of writing is performed. The lower 32 bits of memory are read from memory line 44 and latched into latch 56. Once latched into latch 56, the upper 32 bits are read from memory on line 44 and latched into latch 58. At the same time that the memory bits are read on line 44, the check bits are read on line 55, check bits 0–3 being read when memory bits 0–31 are read, and check bits 4–7 are read when memory bits 32–63 are read. The check bits 0–3 are impressed on latch 62 and latched, and check bits 4–7 are impressed on and latched in latch 64. When the entire 64 bit quad word and the associated 8 check bits are read, the data is read from latches 56 and 58 onto 64-bit data line 66 which is a reconstitution of the original 64 bit quad word, which reconstructed 64-bit quad word is then delivered into the correcting section 46b of the ECC generator/corrector, and check bits 0–7 are read from latches 62 and 64 onto 8-bit check bit line 68 into the correcting section 46b of the error correction code generator 46. The necessary correction function is performed by the error correction code generator/corrector 46 and correct data in the form of a corrected reconstituted 64 bit Quad word is supplied on 64-bit line 70 to the corrected data latch 72, which impresses the corrected data on multiplexor 74. The multiplexor 74 divides the 64 bits of corrected data into the lower 32 bits, bits 0–31, and impresses them onto the data line 14 of the system bus and then, after these have been asserted on the system bus, the remaining 32 bits are asserted onto the line, completing a read cycle. The read cycle will be described in more detail in conjunction with the wave form diagram of the read cycle.

If a read-modify-write cycle is to be performed, a read cycle is performed prior to the write cycle with the corrected data in the form of the corrected reconstituted 64 bit Quad word being impressed from the corrected data latch 72 through line 76 onto the 128 bit wide read-modify-write multiplexor 26. Then, partial data being written on the CPU bus data line 14 is asserted on the multiplexor latch 18 or latch 22, and the multiplexor overlays the corrected data and the system data from latch 18 or 22 into the ECC latch 32 which supplies the new data for which check bits are to be generated onto line 34 and the write cycle continues as previously described. If more than 4 bytes are to be written in a 32-bit system bus system in the RWM operation a second cycle is needed.

Figure 3A:
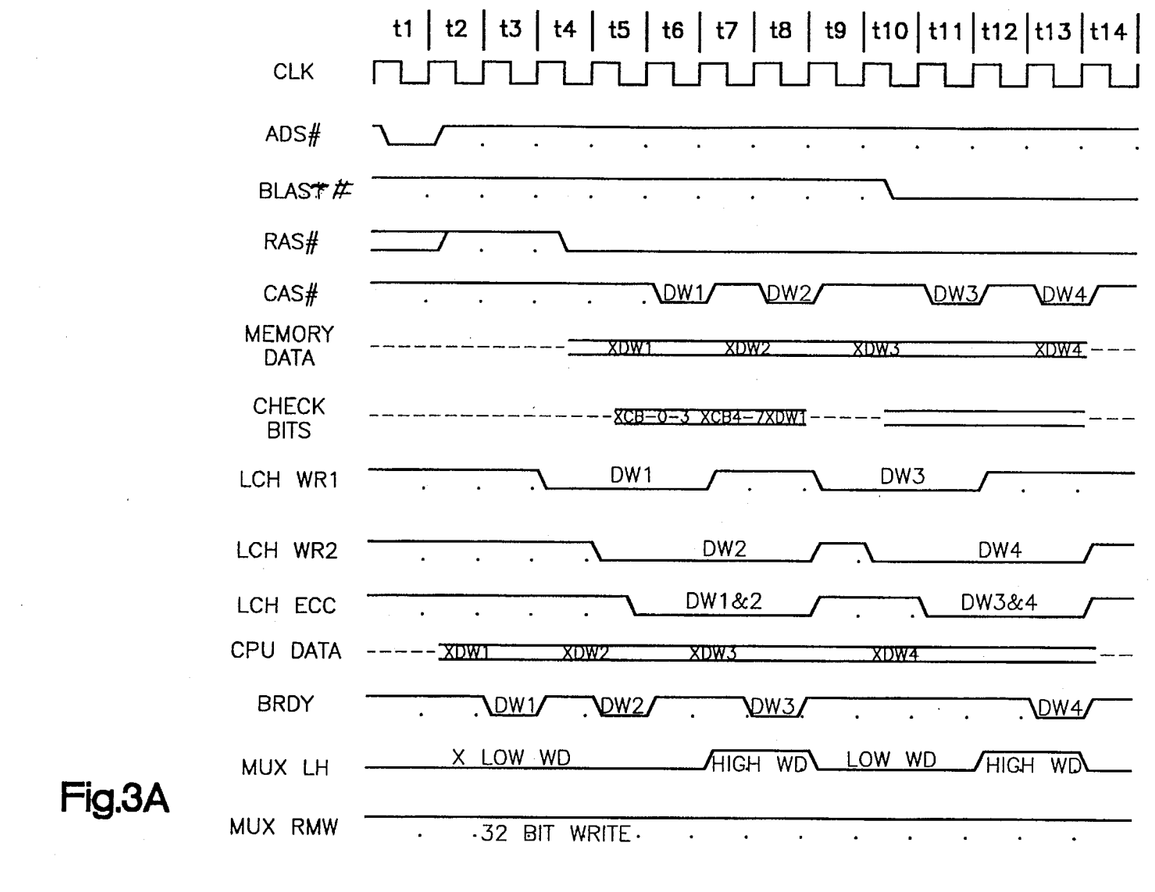
FIG. 3A is a wave form diagram of a write cycle for the circuitry of FIG. 2.

The various operations will now be described in more detail with respect to the various wave form diagrams. Referring now to FIG. 3A, on clockcycle T1 the ADS signal goes low, and the CPU starts writing data during clockcycle T2, the data being the data of double word one (DW1) which is 32 bits wide, i.e., bits 0–31, as shown on CPU data line. At the end of clockcycle T3, the latch 18 latches in data word DW1 and immediately data word DW1 is impressed through multiplexor 26 and latch 32, (which in this configuration are open and transparent) onto line 34, and on multiplexor 40. These bits constitute the data memory DW1 shown in the memory data. Once the data word DW1 has been latched in at clock cycle T4, the CPU generates double word DW2, i.e., the next 32 bits, bits 31–64 which are put on the CPU bus and they appear at latch 22. These then are immediately impressed through multiplexor 26 and latch 32, (which are both open) and onto the line 34, and are latched at latch 22 thus providing a complete quad data word of 64 bits wide, i.e., bits 0–63, at the multiplexor 40. These same 64 bits are also impressed on the ECC generator/decoder 46, and the generating section 46a generates check bits 0–7. Check bits 0–3 are impressed on line 48 to multiplexor 52, and check bits 4–7 are impressed on line 50 to multiplexor 52. Thus, at this point, the 64-bit data word is impressed on the multiplexor 40 and the 8 check bits are impressed on the multiplexor 52. Once data and check bits have been generated, multiplexors 40 and 52 send the data bits 0–31 and check bits 0–3 onto data memory bus 44 and check bit bus 55 as indicated by the multiplexor L/H line. Data and check bits are written into memory with CAS pulse at clockcycle T6. At clockcycle T7 when the multiplexor line goes high, the multiplexor 40 and multiplexor 52 are driven to the high data bus to write the data bits 32–63 and check bits 4–7 to memory. During clockcycle T8 CAS goes low to write data and check bits into memory. The 64 data bits and 8 check bits have been latched into memory by the end of the 8th clockcycle. This completes the write operation. It will be noticed, however, that in order to achieve economy of operation and speed up the write cycle, the writing of the second quad word, which will be composed of double word 3 (DW3) and double word 4 (DW4) of CPU data, does not have to wait until the end of the entire cycle. It can be seen that as soon as DW2 of the first quad word has been latched in memory, and since DW1 is also latched therein, the CPU bus need no longer be maintained generating these words and is thus free to start the generation of the next quad word. Therefore, as can be seen on the CPU data line, after the 6th clock cycle line, DW2 is put onto the CPU bus. This will not affect, any part of the writing or latching of the first quad word because the latch 18 is latched, and latch 22 is also latched, and the latch 32 has latched therein both halves of the quad word. Therefore, activity on the bus will not affect the generation of the check bits or writing the correct data and check bits to memory. The various signals provide timing such that two quad words can be written and latched into memory within 14 clockcycles even though the first data word may not be latched into memory until after 9 clockcycles.

Figure 3B:
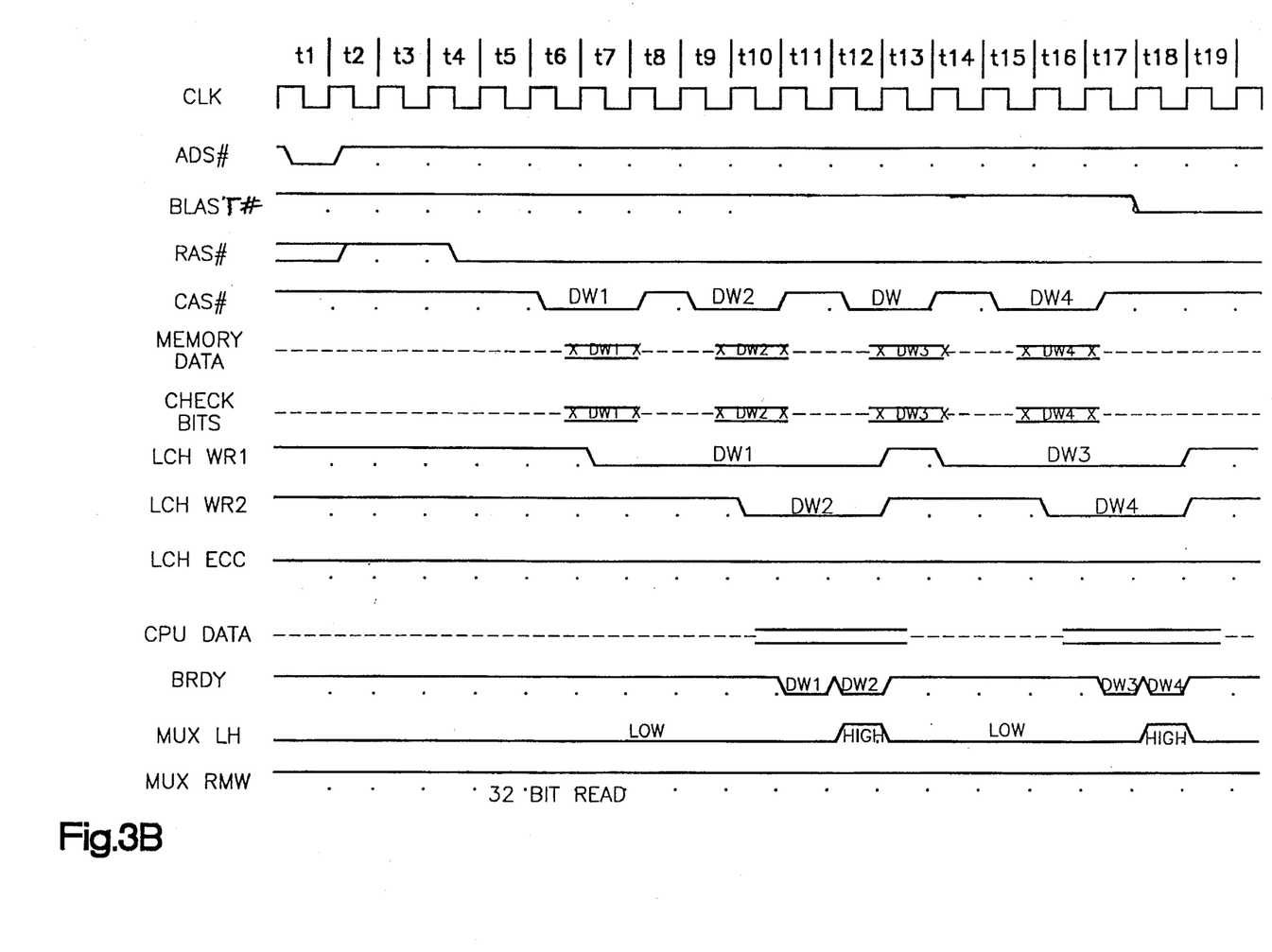
FIG. 3B is a wave form diagram of a read cycle for the circuitry of FIG. 2.

Referring now to FIG. 3B, a diagram of the wave form for a read cycle of the present invention is shown. In the first clockcycle T1, the ADS line goes low, indicating that a read is to be started. At this point, the RAS line goes high, followed by the CAS line going low, and on clockcycle T6 the lower portion of the quad word or bits 0–31 of the DW1 are read from memory as shown on the memory data line. At the same time, the check bits are also asserted on the check bit line. When these are asserted on the line, latch 56 latches the 32-bit word DW1 from line 44. In clockcycle T9, the data word DW2 is read from memory onto line 44 and latched into latch 64 at clockcycle T10. As soon as the DW2 constituted of bits 32–63 is impressed on latch 58, these are read onto the 64-bit data line 66 together with the lower 32 bits, i.e., bits 0–31, into the correction section 46b of the error correction code generator/decoder 46. Similarly, when all of the check bits 0–7 have been impressed on latch 62, 64, they are read into the correcting section 46b of the error correction code generator 46, and the data is corrected and put on 64-bit line 70 and impressed on the corrected data latch 72 as corrected reconstituted original 64 bit Quad word. This is shown at clock cycle T10 on the corrected data latch 72. When the BRDY goes low, data word DW1 is delivered by the multiplexor 74, driver 78 and 32-bit line 20 and impressed on the data bus 14 of the CPU, following which the BRDY line goes high and then low again and impresses the second data word DW2, i.e., bits 31–63, onto 32-bit line 20 and onto the data line 14. This is controlled by controlling the multiplexor line going high at clockcycle 12 and then again low at clockcycle 13.

Figure 3C:
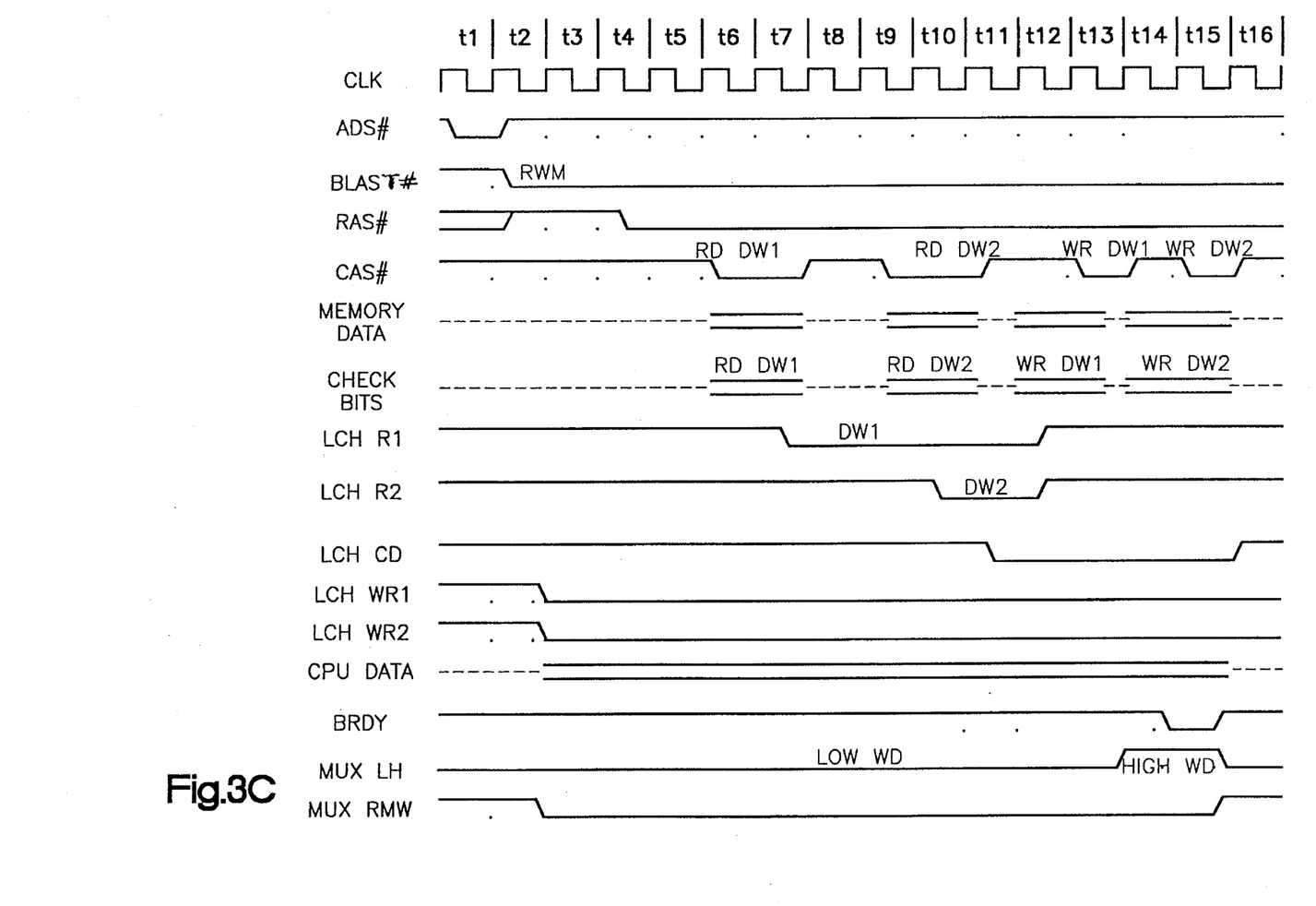
FIG. 3C is a wave form diagram of a read-modify-write cycle for the circuitry of FIG. 2.

The read-modify-write cycle is shown in the read-modify-write wave form. The ADS signal at clockcycle 1 goes low, indicating that the write operation is to begin. The BLAST line is low at clockcycle 2 indicating that a non-burst write mode will occur. According to this invention, this is a read-modify-write and not a regular write cycle. The RAS goes high and CAS goes low, and the memory data and check bits are read from memory as previously described. DW1 is latched in. Latch 56 and check bits associated with DW1 are latched in latch 62. CAS then goes high and low again indicating a second read cycle at the next address, and DW2, i.e., data bits 32–63 and check bits 4–7 are latched in latches 62, 64 as previously described, and thus delivered through the correction section 46b of the error correction code generator/corrector 46 and are applied on the 64-bit line 70 and latched in the corrected data latch 72 as the corrected data. These are then applied through 64-bit line 76 to the read-modify-write multiplexor 26.

The read-modify-write cycle continues by utilizing the so-called overlay technique in which system data is written through latches 18 or 22 to the multiplexor 26 and overlaid on the corrected, reconstituted 64-bit quad word. This technique is represented diagrammatically in Table II below.

TABLE II

| | Byte Enables | | | | | Data from CPU | | | | | | | | Read Data from | | | | | | | | Overlay of CPU | | | | | | | |
| | | | | | CPU | HIGH- | | | | | | | | Memory Corrected | | | | | | | | & Corrected Data | | | | | | | |
| | BE# (3:0) | | | | Addr | WR2 | | | | LOW-WR1 | | | | CD-HIGH | | | | CD-LOW | | | | HIGH | | | | LOW | | | |
| RMW | 3 | 2 | 1 | 0 | A2 | 3 | 2 | 1 | 0 | 3 | 2 | 1 | 0 | 7 | 6 | 5 | 4 | 3 | 2 | 1 | 0 | 3 | 2 | 1 | 0 | 3 | 2 | 1 | 0 |
| YES | 0 | 0 | 0 | 0 | 0 | A | B | C | D | A | B | C | D | S | T | U | V | W | X | Y | Z | S | T | U | V | A | B | C | D |
| YES | 1 | 0 | 0 | 0 | 0 | — | B | C | D | — | B | C | D | S | T | U | V | W | X | Y | Z | S | T | U | V | W | B | C | D |
| YES | 1 | 1 | 0 | 0 | 0 | — | — | C | C | — | — | C | D | S | T | U | V | W | X | Y | Z | S | T | U | V | W | X | C | D |
| YES | 1 | 1 | 1 | 0 | 0 | — | — | — | D | — | — | — | D | | | | | W | X | Y | Z | S | T | U | V | W | X | Y | D |
| YES | 0 | 0 | 0 | 0 | 1 | A | B | C | D | A | B | C | D | S | T | U | V | W | X | Y | Z | A | B | C | D | W | X | Y | Z |
| YES | 1 | 0 | 0 | 0 | 1 | — | B | C | D | — | B | C | D | S | T | U | V | W | X | Y | Z | S | B | C | D | W | X | Y | Z |
| YES | 1 | 1 | 0 | 0 | 1 | — | — | C | D | — | — | C | D | S | T | U | V | W | X | Y | Z | S | T | C | D | W | X | Y | Z |
| YES | 1 | 1 | 1 | 1 | 1 | — | — | — | D | — | — | — | D | S | T | U | V | W | X | Y | Z | S | T | U | D | W | X | Y | Z |

HIGH - BITS 63-32
LOW - BITS 32-0

First, it should be noted that in a 32-bit wide CPU bus system, only a single double word of 32 bits can be overlaid on the quad word in any read-modify-write operation. Therefore, if more than 32 bits, i.e., more than 4 bytes, are to be rewritten during the read-modify-write cycle, two read-modify-write cycles must be performed, the first read-modify-write cycle being performed to correct the lower data bits, e.g., 0–31 (bytes 0–3) of the quad word, and the second read-modify-write cycle being performed to correct that portion of the higher bits, e.g., 32–63 (bytes 4–7) of the quad word, which must be corrected.

In Table II, the data read and corrected from memory is represented by the letters S, T, U, V, W, X, Y, Z. This is accomplished in the following fashion. The letter Z represents the first eight bits of data word DW1 and is shown as byte 0 in the table; the letter Y represents byte 1 of data word DW1; letter X represents byte 2 of data word DW1; letter W represents byte 3 of data word DW1; letter V represents byte 4 of the entire quad word which is byte 0 of data word DW2; letter U represents byte 5 of the quad word; letter T represents byte 6 of the quad word; and the letter S represents byte 7 of the quad word. Thus, the eight bytes of the corrected data are represented by the letters S, T, U, V, W, X, Y, Z in Table II. Data written from the CPU is represented by letters A, B, C and D. Letter D represents byte 0 from the new data word being written; letter C represents byte 1 from the new data word being written; letter B represents byte 2 from the new data word being written; and letter A represents byte 3 from the new data word being written. Since only one 4-byte, 32-bit data word can be written at a time for any given cycle, only the letters A, B, C and D are used to describe the bytes. Whether these are to be used to correct the bits represented by S, T, U and V, or W, X, Y and Z will depend on the state of the byte enable lines and state of the address line A2 from the CPU, as will be described presently.

In all instances, the corrected quad data word is applied to the multiplexor 26 as an 8-byte word S, T, U, V, W, X, Y, Z. The number of bytes to be rewritten is controlled by the CPU, and those bytes are impressed on the data bus 14. How these bytes are controlled for rewriting is controlled by the byte enable lines 0, 1, 2 and 3 as shown in Table II. When these lines are all in the "0" state, then the CPU will write data bytes A, B, C and D. The other patterns of 1's and 0's on the byte enable lines as shown in Table II indicate whether data bytes B,C,D, C and D, or just D are written. Further, whether these constitute a part of data word DW1, i.e., bytes 0–31, or part of data word DW2, i.e., bytes 32–63 of quad word, depends on whether CPU address line A2 is at logic "0" or logic "1".

Thus, the first read-modify-write cycle would proceed in the following way. The reconstituted, corrected quad data word of 64 bits, i.e., bytes 0–7, are impressed in the multiplexor 26. If the CPU is to rewrite all four bytes of data word DW1, bytes A, B, C and D are written onto the data bus 14 and onto the lines 20 and 24 at the same time. Data can be latched in either latch 18 or 22, or the latches 18 and 22 can be transparent to the data bus system. These are impressed on the multiplexor 26 as data bytes A, B, C and D by byte enable lines 0, 1, 2 and 3 being at logic "0" and the CPU address line being at logic "0". This will cause bytes A, B, C and D to be overlaid on bytes 0, 1, 2 and 3 of the corrected, reconstituted data word and written into the ECC latch 32 as a quad data word with bytes S, T, U, V, A, B, C, D as shown in Table II. This new quad data word, as modified, then goes through the error correction code generating section 46a and is impressed on multiplexor 40, and the modified data word is written to memory with the check bits as described previously.

If only data bytes B, C and D are to be rewritten in the data word DW1 portion of the quad word, then byte enable line 3 is driven to a logic "1" while byte enable line 2, 1 and 0 are held at logic "0". This will cause a rewritten data word of bytes S, T, U, V, W, B, C and D to be impressed on the ECC latch 32 as the rewritten quad word. Similarly, if bytes C and D of the data word DW1 are to be rewritten, then the corrected rewritten data word would be S, T, U, V, W, X, C and D; and if only byte D of data word DW1 is to be rewritten, then the rewritten data word would be S, T, U, V, W, X, Y and D. This is all that is required if only bytes 0, 1, 2, and 3, or 0, 1 and 2, or 0 and 1 or just 0 in the quad word are to be rewritten.

If, however, a read-modify-write operation requires writing of more than four consecutive bytes of data, then this requires rewriting of data word DW1 and some of the bytes of data word DW2 of the quad word. At this point, the cycle of rewriting the modified data with the modified data bits is repeated but with the CPU address line A2 driven to the opposite logic state. Again, a read cycle is performed which reads data from the address locations which include both the upper and lower bits of the quad word, i.e., the entire 64 bits of the quad word. In this read cycle, the newly written bytes 0, 1, 2 and 3 are read as data from the address, and again are indicated with the letters S, T, U and V for consistency, it being understood that in this case the S, T, U and V represent the rewritten data from the lower bytes in the previous cycle. To modify the bytes 0, 1, 2 and 3 of the data word DW2, the byte enable lines 3, 2, 1 and 0 are all held at a logic "0" and the CPU address line is held at a logic "1". These bytes are then written as bytes A, B, C and D on the CPU bus 16 through latches 18 and 22 and impressed on the multiplexor 26. Since the multiplexor is driven high, the overlay occurs on bytes 4, 5, 6 and 7 of the quad word, thus causing the overlay to be A, B, C, D, W, X, Y, Z as shown in the corrected data table. Similarly, if only bytes B, C and D, or C and D, or D are to be rewritten, a similar pattern is followed as described above so that the data is overlaid. The end result is in either one cycle if only four bytes or less are to be written, or two cycles if more than four bytes are to be written, a read-modify-write operation has been performed, and the modified word stored in memory.

It will be noted that the read-modify-write cycle takes a significant number of clockcycles. However, for most operations, a read-modify-write cycle is not necessary and the data is transferred in burst transfers or burst cycles. Hence, very little of the data is actually rewritten in a read-modify-write cycle.

With respect to the type of error correction code, any type of 64-bit error correction code can be used. A particularly desired one is the SEC-DED-S4ED code. This is the well-known SEC-DED Hsiao code rearranged so that adjacent 4-bit errors can be detected. This is the preferred code, and the matrix for generating check bits is shown in the following table. However, any 64/8 algorithm ECC code can be used.

TABLE III

| Generated Check Bits | \multicolumn{16}{c}{Participating Data Bits} |
|---|---|
| | 0 | 1 | 2 | 3 | 4 | 5 | 6 | 7 | 8 | 9 | 10 | 11 | 12 | 13 | 14 | 15 |
| CB0 | X | | | | | | X | | X | | | | X | X | X | X |
| CB1 | | X | X | | | X | | | X | X | X | X | X | X | | |
| CB2 | X | | | X | X | X | | X | X | | | X | | | | X |
| CB3 | | | | X | X | | | | | | | X | | X | | |
| CB4 | | | X | | X | | | | | X | | | | X | | |
| CB5 | X | X | | | | X | | | | X | | | | | X | |
| CB6 | | | X | X | | | | X | | | | | X | X | X | X |
| CB7 | | X | | | | | | X | | | | | X | | X | |

| Generated Check Bits | \multicolumn{16}{c}{Participating Data Bits} |
|---|---|
| | 16 | 17 | 18 | 19 | 20 | 21 | 22 | 23 | 24 | 25 | 26 | 27 | 28 | 29 | 30 | 31 |
| CB0 | | X | | | | | | | | | | X | | X | | |
| CB1 | | X | | | | X | | X | | | | | | | | X |
| CB2 | | | X | | | | X | X | X | X | | | | | | X |
| CB3 | X | X | | X | | | | | | X | | X | | | X | |
| CB4 | | | X | | X | | | | | | | X | | X | | X |
| CB5 | | X | | | | | X | | X | | | | X | | | |
| CB6 | X | X | | | | X | | | | | X | | | X | | |
| CB7 | X | | | | | | X | X | | | | | | X | X | |

| Generated Check Bits | \multicolumn{16}{c}{Participating Data Bits} |
|---|---|
| | 32 | 33 | 34 | 35 | 36 | 37 | 38 | 39 | 40 | 41 | 42 | 43 | 44 | 45 | 46 | 47 |
| CB0 | X | | | | | X | | X | | | | | X | X | X | X |
| CB1 | X | X | | X | | | | | | | X | X | | X | | |
| CB2 | | | | X | | | | X | | | | | | | X | X |
| CB3 | | X | | X | X | X | X | | | | X | | | X | | X |
| CB4 | X | | | X | | X | | | X | X | X | X | | | X | |
| CB5 | | X | | | | X | X | X | X | | | | | X | | |
| CB6 | | X | X | | | | X | | | | | X | | X | X | |
| CB7 | | X | X | X | X | | X | X | X | X | X | | | | | |

| Generated Check Bits | \multicolumn{16}{c}{Participating Data Bits} |
|---|---|
| | 48 | 49 | 50 | 51 | 52 | 53 | 54 | 55 | 56 | 57 | 58 | 59 | 60 | 61 | 62 | 63 |
| CB0 | X | X | X | X | | | X | | X | | | X | | | | X |
| CB1 | X | | | | | X | | X | X | | X | X | | | | |
| CB2 | | X | | | X | X | | X | | | X | | | | | |
| CB3 | | | | X | | X | X | | | X | | | X | | | |
| CB4 | | X | | | | X | X | X | | X | | X | | | | X |
| CB5 | X | | | X | | | X | | | | | X | X | X | | |
| CB6 | | | X | X | X | | | X | X | X | X | | | | | |
| CB7 | | X | | | X | | X | | | | | X | X | X | X | |

| Generated Check Bits | \multicolumn{8}{c}{Participating Data Bits} |
|---|---|
| | 64 | 65 | 66 | 67 | 68 | 69 | 70 | 71 |
| CB0 | X | | | X | | X | | |
| CB1 | | X | | | X | | | |
| CB2 | X | X | X | | | | X | |
| CB3 | X | | X | X | | | | X |
| CB4 | | X | | | | | X | X |
| CB5 | X | X | X | X | | X | | X |
| CB6 | X | | | | | | X | |
| CB7 | | | | X | | X | | |

The following Table IV indicates the comparison of data read and write time, comparing the method shown in FIG. 1A with that of the invention shown in FIG. 1C and described herein.

TABLE IV

| Cycle | Method 1 | Invention |
|---|---|---|
| Read 16-bytes | 17 tclks | 18 tclks |
| Write 16-bytes | 12 tclks | 14 tclks |
| RMW 1-byte | 10 tclks | 15 tclks |

It can be seen that there is very little additional time required to perform either the read or the write cycles, and then is a substantial savings as indicated above in the amount of storage space required and the number of modules required for the design of the present invention compared to the design utilizing the techniques shown in FIG. 1A.

What is claimed is:

1. A computer system and a memory storage device interfacing with said computer system through a memory controller, said computer system including a 32-bit data bus and logic to write 4-byte data words on said data bus, said memory storage device being configured to store 36 bits at each address location of said storage device, said memory controller comprising:
logic to receive first and second successive 4-byte data words from said data bus and combine said two 4-byte data words to form a single 8-byte data word;
error correction code generating logic to generate an 8 check bit error correction code from said 8-byte data word;
logic to successively store one of said 4-byte data words with a first 4 of said generated check bits at a first address location, and the other of said 4-byte data words with a second 4 of said generated check bits at a second address location;
logic to read successively each of said first and second 4-byte data words along with the check bits stored with each 4-byte data word from said first and second address location in said memory device, and combine said first and second 4-byte data words to reconstitute the originally formed 8-byte data word;
error correcting decode logic to receive said reconstituted 8-byte data word and associated 8 check bits and correct errors detected;
and logic to write said reconstituted and corrected 8-byte data word onto the data bus of said computer system as two successive 4-byte data words.

2. The system as defined in claim 1 wherein said logic to receive said first and second data words written from said bus includes a first write data word latch device to latch said first data word written by said bus while said second data word is being written by said bus.

3. The system as defined in claim 2, including a second data word latch to latch said second data word after it has been written by said bus and during logic function generating error correction code.

4. The system as defined in claim 2, including logic to combine the first data word from the first data word latch device and the second data word to form said 8-byte data word.

5. The system as defined in claim 4, wherein the logic to combine the first and second written data words includes a multiplexor.

6. The system as defined in claim 1, wherein the logic to receive and successively store said 8-byte data word as two 4-byte words includes a multiplexor.

7. The system as defined in claim 1, wherein said logic to read each of said 8-byte data words and check bits from the memory storage device includes logic to read said first 4-byte data word and associated check bits first and read said second 4-byte data word and associated check bits next.

8. The system as defined in claim 7, wherein said logic to read said 8-byte data words and check bits stored therewith from the memory storage device includes a first read data word latch device to store said first 4-byte data word and associated check bits read from the address while said second 4-byte data word and associated check bits are being read from address storage.

9. The system as defined in claim 8, further including logic to read said 8-byte data word from storage includes a second 4-byte read data word latch device to latch said second data word when it is read from storage.

10. The system as defined in claim 1, further comprising said logic to write said corrected 8-byte data word onto the data bus including an 8-byte read data word latch device to store said corrected 8-byte data word.

11. The system as defined in claim 10, wherein said logic to write said corrected 8-byte data word onto the data bus includes a multiplexor to write said data from said 8-byte read data word latch device onto said data bus as two successive 4-byte data words.

12. A method of forming 8-byte data words with error correction code in a computer system and a memory storage device interfacing with said computer system, and wherein said computer system includes a 32-bit data bus and logic to write 4-byte data words on said data bus, and said memory storage device is configured to store 36 bits at each address location of said storage device, and a memory controller, said method comprising:
receiving first and second successive 4-byte data words from said data bus, combining said two successive 4-byte data words received from the data bus to form a single 8-byte data word;
generating an 8 check bit error correction code from said 8-byte data word;
successively storing one of said 4-byte data words with a first 4 of said generated check bits at a first address location, and the other 4-byte data word with 4 of said generated check bits at a second address location;
reading successively each of said first and second 4-byte data words together with the check bits stored with said data words from said first and second address locations in said memory device, and combining said first and second 4-byte data words to reconstitute the originally formed 8-byte data word;
correcting any errors in the reconstituted 8-byte data word using the associated 8 check bits;
and writing said reconstituted and corrected 8-byte data word onto the data bus of said computer system as two successive 4-byte data words.

13. The method as defined in claim 12, including latching said first data word written by said bus while said second data word is being written by said bus.

14. The method as defined in claim 13, including latching said second data word after it has been written by said bus and during the logic function generating error correction code.

15. The method as defined in claim 12, wherein said first 4-byte data word and associated check bits are read first and said second 4-byte data word and associated check bits are read next from memory.

16. The method as defined in claim 15, including latching said first 4-byte data word and associated check bits read from the address while said second 4-byte data word and associated check bits are being read from said storage device.

17. The method as defined in claim 16, including latching said second 4-byte data word when it is read from said storage device.

\* \* \* \* \*